US012365793B2

(12) United States Patent
Yocca et al.

(10) Patent No.: US 12,365,793 B2
(45) Date of Patent: Jul. 22, 2025

(54) FUNCTIONALIZED PROCESS AID BLENDS FOR CELLULAR PVC

(71) Applicant: Arkema Inc., King of Prussia, PA (US)

(72) Inventors: Kevin R. Yocca, King of Prussia, PA (US); Eric J. Peterson, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 203 days.

(21) Appl. No.: 17/771,535

(22) PCT Filed: Oct. 29, 2020

(86) PCT No.: PCT/US2020/057857
§ 371 (c)(1),
(2) Date: Apr. 25, 2022

(87) PCT Pub. No.: WO2021/087041
PCT Pub. Date: May 6, 2021

(65) Prior Publication Data
US 2022/0403155 A1 Dec. 22, 2022

Related U.S. Application Data

(60) Provisional application No. 62/927,736, filed on Oct. 30, 2019.

(51) Int. Cl.
*C08L 63/00* (2006.01)
*C08J 9/00* (2006.01)
(Continued)

(52) U.S. Cl.
CPC .............. *C08L 63/00* (2013.01); *C08J 9/0061* (2013.01); *C08J 9/04* (2013.01); *C08J 9/228* (2013.01);
(Continued)

(58) Field of Classification Search
CPC ................ C08J 2323/28; C08J 2327/06; C08J 2333/08; C08J 2333/10; C08J 2363/00;
(Continued)

(56) References Cited

U.S. PATENT DOCUMENTS

| 3,301,919 A | 1/1967 | Cenci et al. |
| 11,220,596 B2 | 1/2022 | Yocca et al. |

(Continued)

FOREIGN PATENT DOCUMENTS

| KR | 101030513 B1 | 4/2011 | |
| WO | WO-2017165582 A1 * | 9/2017 | ............... C08L 25/06 |

*Primary Examiner* — Hai Vo
(74) *Attorney, Agent, or Firm* — Debodhonyaa Sengupta

(57) ABSTRACT

A method of reducing foamed density that results in a foamed polyvinyl chloride (PVC) component exhibiting reduced density. The foamed PVC component contains at least a PVC resin and a process aid blend. The process aid blend contains from 1 weight % to 60 weight % (based on the weight of the blend) of a functionalized process aid, and from 99 weight % to 40 weight % (based on the weight of the blend) of a non-functionalized process aid. The functionalized process aid includes at least one base polymer functionalized with a reactive epoxy, hydroxyl, β-keto ester, β-keto amide, or carboxylic acid functional group. The foamed PVC component containing the process aid blend has a lower density than a reference foamed PVC component made using the same process conditions and additives, but which contains only non-functionalized process aid and not the functionalized process aid.

21 Claims, 4 Drawing Sheets

Force versus Pull-Off Speed for PVC foam compounds with process aid blends.

(51) Int. Cl.
  *C08J 9/04* (2006.01)
  *C08J 9/228* (2006.01)
  *C08L 23/286* (2025.01)
  *C08L 33/08* (2006.01)
  *C08L 33/10* (2006.01)

(52) U.S. Cl.
  CPC ............. *C08L 23/286* (2013.01); *C08L 33/08* (2013.01); *C08L 33/10* (2013.01); *C08J 2323/28* (2013.01); *C08J 2333/08* (2013.01); *C08J 2333/10* (2013.01); *C08J 2363/00* (2013.01); *C08L 2203/14* (2013.01); *C08L 2205/02* (2013.01)

(58) Field of Classification Search
  CPC ............. C08J 2400/104; C08J 2400/105; C08J 2400/106; C08J 2423/28; C08J 2433/06; C08J 9/0061; C08J 9/04; C08J 9/06; C08J 9/228; C08L 2203/14; C08L 2205/02; C08L 2205/025; C08L 2205/03; C08L 23/286; C08L 27/06; C08L 33/06; C08L 33/08; C08L 33/10; C08L 63/00
  See application file for complete search history.

(56) References Cited

U.S. PATENT DOCUMENTS

| | | |
|---|---|---|
| 2009/0093560 A1 | 4/2009 | Van Rheenen et al. |
| 2009/0264567 A1 | 10/2009 | Prins et al. |
| 2014/0371396 A1 | 12/2014 | Van Rheenen et al. |
| 2019/0016838 A1 | 1/2019 | Lee et al. |
| 2019/0055389 A1 | 2/2019 | Yocca et al. |
| 2020/0231796 A1 | 1/2020 | Yocca et al. |

\* cited by examiner

Figure 1. Force versus Pull-Off Speed for PVC foam compounds with process aid blends.
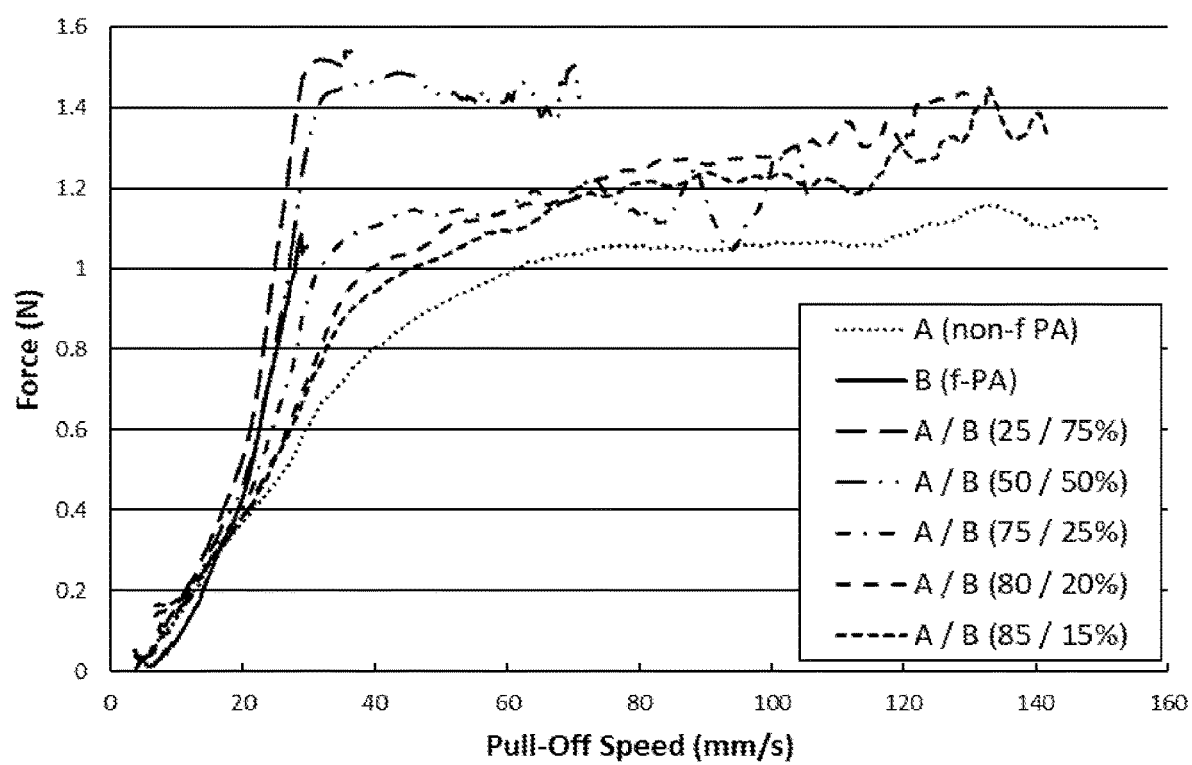

Figure 2. Density versus CBA Feed Rate for ½" (1.27 cm) PVC foam board extrusion results.
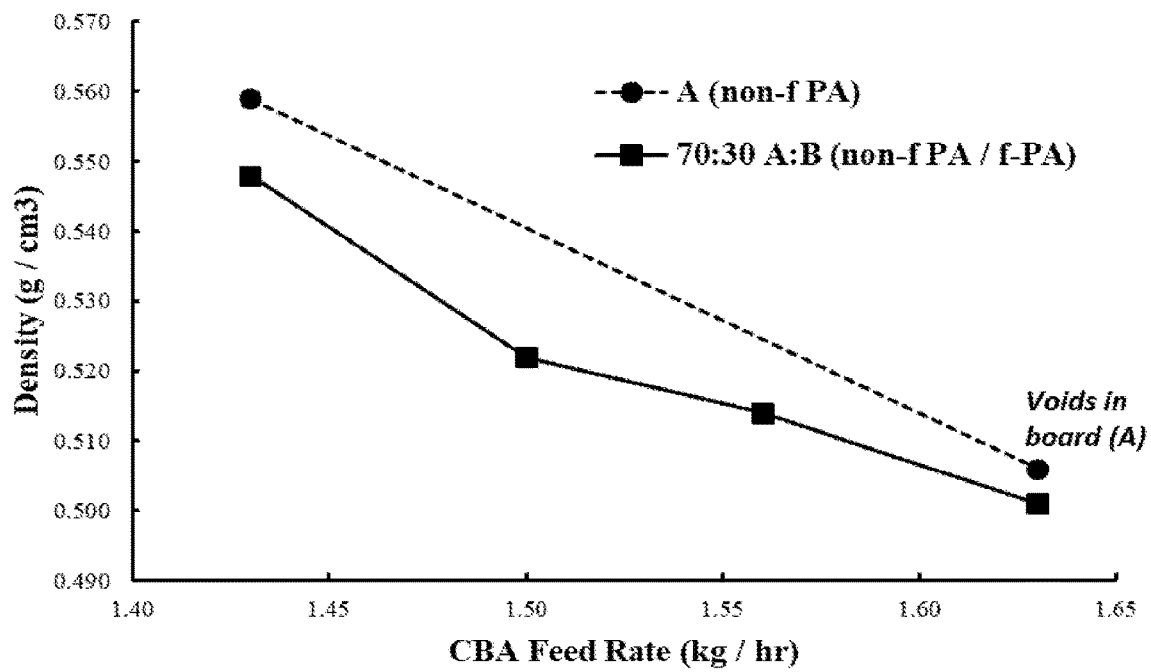

Figure 3. Images of cell structure for non-functionalized process aid (A) versus process aid blends with non-functionalized (A) and functionalized (B) process aids. (scale bar = $3.7 \times 10^{-4}$ m).
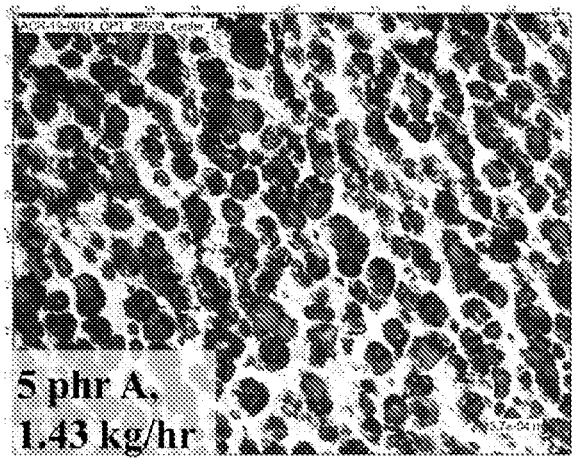
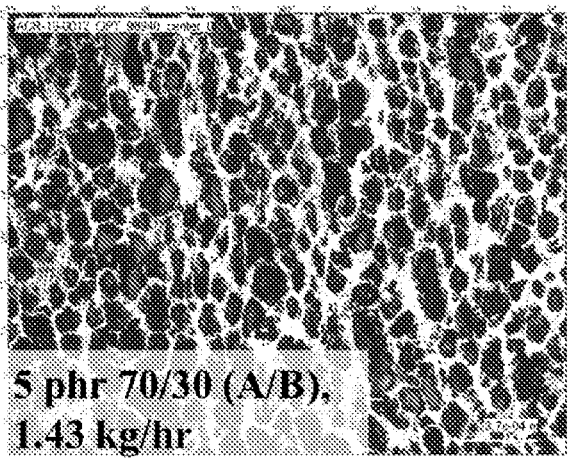
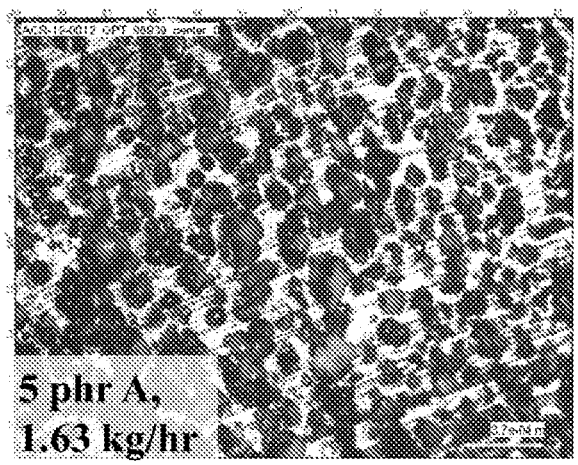
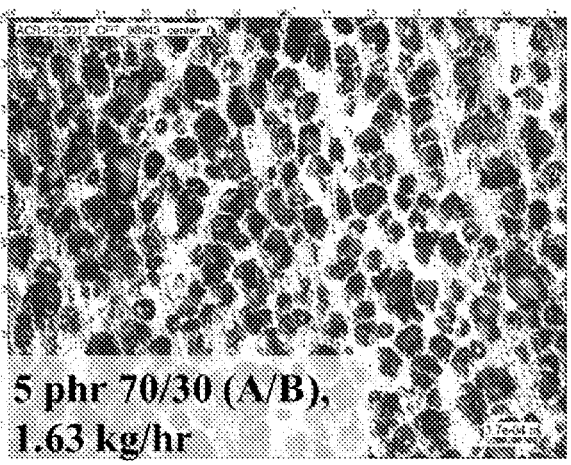

Figure 4. Image of a void in a cellular structure formed when PVC melt strength is too low.
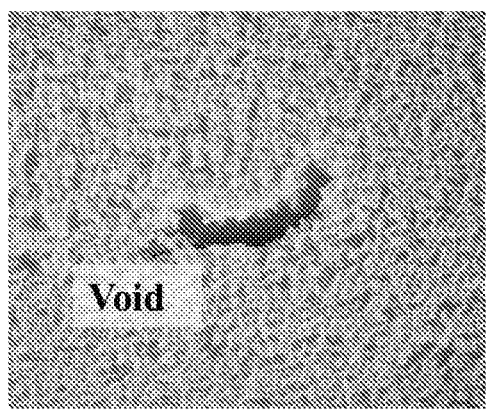

FUNCTIONALIZED PROCESS AID BLENDS FOR CELLULAR PVC

This application is a national stage application under 35 U.S.C. § 371 of PCT/US2020/057857 filed Oct. 29, 2020, which claims benefit to U.S. patent application Ser. No. 62/927,736, filed Oct. 30, 2019.

FIELD OF THE INVENTION

This disclosure relates to process aids used in polyvinyl chloride (PVC) formulations and other thermoplastic polymers. More specifically, the present disclosure relates to process aids capable of reducing the density of foamed PVC components and other foamed thermoplastic polymer components.

BACKGROUND OF THE INVENTION

Foamed polyvinyl chloride (PVC) resins are generally chemically inert, resistant to water and environmental corrosion, provide good electrical and thermal insulation, and can maintain performance over a large temperature range. The commercial polymerization processes and post-polymerization processing techniques (e.g., extrusion, injection molding, blow molding, etc.) used with polyvinyl chloride ("PVC" or "vinyl" as it is commonly called), have matured. This manufacturing base along with the basic properties exhibited by PVC has led to a proliferation of foamed PVC-containing products. For example, foamed PVC components are used as structural and decorative building materials. Vinyl products are durable, recyclable, and easily maintained. They are resistant to fungus and mildew growth and unaffected by rot, corrosion, cracking, flaking, or insect infestation. Vinyl products exhibit excellent fire resistance properties, which meet most building codes for ignitability, flammability, heat released, burning rate, flame spread, and smoke generation. Since vinyl products typically are the same color throughout, minor scratches do not require painting or repair, and the aesthetics are easily maintained by washing with soap and water. Further, foamed PVC building products can be painted. When properly installed and maintained, vinyl products provide long lasting aesthetics, reliable performance, and continued energy savings.

The dispersion of pigments into the PVC formulation can provide color, while the incorporation of matting agents into the formulation can modify the surface gloss exhibited by a final PVC product.

PVC can be used by itself as the base resin in a formulation. PVC can also be blended with other thermoplastic resins, such as acrylics, including polymethyl methacrylate, acrylonitrile styrene acrylate copolymers, polycarbonate, acrylonitrile butadiene styrene copolymers, and polyvinylidene difluoride to form an alloy. These PVC alloys can then be formulated with various additives including pigments and matting agents to achieve the desired appearance in a similar fashion as a PVC formulation. These PVC alloys can also be used in a similar capacity as PVC resins using similar post-polymerization processes to yield the final articles Other thermoplastic resins can also be used in similar capacity as PVC resins or PVC alloys using similar post-polymerization processes to yield the final foamed articles. These resins include acrylic polymers, styrenics, polyolefins, PVC blends, PVC alloys, polycarbonates, polyurethanes, fluoropolymers and mixtures thereof.

U.S. Pat. No. 3,301,919 discloses process aids for polyvinyl chloride that comprise substantially linear copolymers obtained by polymerizing a mixture of 20-98.5 percent by weight methyl methacrylate, 0.5-40 percent by weight of ethyl acrylate and 1-40 percent by weight of glycidyl methacrylate, such that the oxirane ring is intact in at least 85 percent of the glycidyl methacrylate units.

Korean Patent No. 101030513 discloses a method for manufacturing a methacrylate copolymer used as a process aid for a vinyl chloride resin. The method comprises the steps of: polymerizing a monomer mixture in the presence of a water-soluble initiator and an emulsifier to prepare a polymer latex; and solidifying the polymer latex. The monomer mixture comprises 60-85 weight percent of methyl methacrylate, 15-30 weight percent of an alkyl acrylate-based compound and 1-10 weight percent of an epoxide-based compound.

This application incorporates herein by reference in its entirety U.S. Ser. No. 16/081,055, filed Mar. 23, 2017, which claims priority from U.S. 62/313,187, filed Mar. 25, 2016 and PCT/US2018/052624, filed Sep. 25, 2018, which claims priority from U.S. 62/563,841, filed Sep. 27, 2017.

SUMMARY OF THE INVENTION

The present invention generally provides foamed polyvinyl chloride (PVC) and other thermoplastic polymers and resins comprising a process aid blend. The process aid blend comprises from about 1% by weight to about 60% by weight (based on the weight of the process aid blend) of a functionalized process aid, and from about 99% by weight to about 40% by weight (based on the weight of the process aid blend) of a non-functionalized process aid. The functionalized process aid comprises at least one base polymer which is functionalized with a reactive epoxy, reactive hydroxyl, reactive β-keto ester, reactive β-keto amide, or reactive carboxylic acid functional group in an amount of from 0.5 wt. % to 35 wt. % based on the total weight of the functionalized process aid.

In another embodiment, the process aid blend comprises from about 1 to about 24%, preferably about 10%, more preferably from about 1 to about 20%, by weight (based on the weight of the process aid blend) of a functionalized process aid, and from about 99 to about 76%, preferably about 90%, and more preferably from about 80 to 99%, by weight of a non-functionalized process aid. The functionalized process aid comprises at least one base polymer which is functionalized with a reactive epoxy, hydroxyl, β-keto ester, β-keto amide, or carboxylic acid functional group in an amount of from 0.1 wt. % to 35 wt. % based on the total weight of the functionalized process aid.

The foamed PVC or PVC alloy comprising the process aid blend of the invention has reduced density compared to a similar foamed PVC or PVC alloy that comprises only the non-functionalized process aid. The present invention also provides a method of reducing said density compared to such materials that do not comprise the process aid blend.

The foamed PVC or other thermoplastic polymer or blend or alloy thereof comprising the process aid blend also exhibits improved cell structure compared to similar materials that do not comprise the blend of process aids. The foamed PVC or other thermoplastic polymer/resin component comprises: a polymer or resin such as PVC; and a process aid blend. A foamed component made of the PVC or other thermoplastic polymer/resin and the process aid blend exhibits a lower density when compared to a similar foamed component in which the process aid blend is not used. A component made of the PVC or other thermoplastic polymer/resin may be used in an automotive product, a building material, a household or kitchen item, flooring, a medical or office supply product, an electronic product, apparel, or packaging for personal care or other consumer products.

The PVC or PVC alloys comprising the blend of functionalized and non-functionalized process aids may exhibit increased melt viscosity and melt strength that contribute to the lower density and improved cellular structure of foams produced thereof compared to such foams made with only the non-functionalized process aid (but no functionalized process aid).

The functionalized process aids comprise at least one base polymer functionalized with about 0.1 wt. % to about 35 wt. % of a reactive epoxy, hydroxyl, β-keto ester, β-keto amide, or carboxylic acid functional group based on the total weight of the functionalized process aid. The blend of process aids may be present in an amount of from about 0.1 to about 25 phr or from about 0.1 to about 12 phr in PVC formulations or 0.1 to about 20 phr in other (that is, non-PVC) thermoplastic resin components. When desirable, the functionalized process aids may be functionalized with at least 0.1 wt. % or preferably at least 1 wt. % of the reactive functional group based on the total weight of the process aids. The reactive epoxy, hydroxyl, β-keto ester, β-keto amide, or carboxylic acid functional groups in the functionalized process aids may be derived from hydroxyl-substituted alkyl esters of (meth) acrylic acid; vinyl esters of linear or branched carboxylic acids; unsaturated $C_3$-$C_6$ monocarboxylic acids and unsaturated $C_4$-$C_6$ dicarboxylic acids; epoxy group-containing monomers; β-keto esters of (meth)acrylic acids; β-keto amides of (meth)acrylic acids; or a mixture thereof.

The method of reducing the density of the polyvinyl chloride (PVC) or other thermoplastic resin component comprises combining a PVC or other base thermoplastic resin, the process aid blend, a blowing agent (BA) and other additives, including for example stabilizers and lubricants. The blowing agent may be a chemical blowing agent (CBA) or a physical blowing agent or a combination thereof. Next, the PVC resin, the process aid blend, and the BA are combined to form a foamable PVC composition. The foamable PVC composition may then be extruded or otherwise processed in polymer process equipment such as are known in the art to form the foamed PVC component. A person having skill in the art can readily appreciate that the combining and the forming steps may be combined, as for example in a process where the PVC, the process aid blend and CBA are placed together into the hopper of an extruder and then mixed together and formed via the extrusion process. The resulting foamed PVC component exhibits reduced density when compared to a similar foamed PVC component in which only the non-functionalized process aid (but no functionalized process aid) is used.

The density reducing method may further include the process aid blends being present in an amount of from about 0.1 to about 15 parts per hundred (phr) by weight of the PVC resin in PVC formulations or 0.1 to about 25 phr in other thermoplastic resin formulations. When desirable, the functionalized process aid in the process aid blend may be functionalized with at least 0.1 wt. % of the reactive functional group(s) based on the total weight of the functionalized process aid. The reactive epoxy, hydroxyl, β-keto ester, β-keto amide, or carboxylic acid functional group of the functionalized process aid in the blends of process aids may be derived from hydroxyl-substituted alkyl esters of (meth) acrylic acid; vinyl esters of linear or branched carboxylic acids; unsaturated $C_3$-$C_6$ monocarboxylic acids and unsaturated $C_4$-$C_6$ dicarboxylic acids; epoxy group-containing monomers; β-keto esters of (meth)acrylic acids; β-keto amides of (meth)acrylic acids; or a mixture thereof. The reactive functionalized process aid may contain more than one type of functional group, such as, for example, if the functionalized process aid is derived from glycidyl methacrylate (GMA) and/or (hydroxyethyl)methacrylate (HEMA) or is derived from a mixture of any of the above-mentioned compounds. The base polymer of the functionalized process aid may be comprised of an acrylic polymer or copolymer. The base polymer of the non-functionalized process aid may be also be comprised of an acrylic polymer or copolymer. This acrylic polymer or copolymer can be derived from vinyl- or (meth)acrylic-containing monomers; styrene or styrene derivatives; olefins; dienes; or mixtures thereof. The functionalized process aids may have a weight average molecular weight ($M_w$) that is approximately 50,000 g/mol or higher.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a plot of the effect of various process aid blends according to certain embodiments of the present disclosure and the effect of comparative process aids on melt strength and extensibility of PVC compositions.

FIG. 2 is plot of density of foamed PVC components made using a process aid blend according to an embodiment of the present disclosure and a comparative process aid.

FIG. 3 shows representative optical microscopy images of foamed PVC components made using a process aid blend according to an embodiment of the present disclosure and a comparative process aid.

FIG. 4 shows an optical microscopy image of a void in cellular structure formed when PVC melt strength is too low.

DETAILED DESCRIPTION

The following description is merely exemplary in nature and is in no way intended to limit the present disclosure or its application or uses. For example, the polyvinyl chloride (PVC) formulations made and used according to the teachings contained herein may be described throughout the present disclosure in conjunction with "PVC" or "vinyl" trim boards, moldings, windows, and doors in order to more fully illustrate the composition and the use thereof. The incorporation and use of such a PVC formulation in other applications or products are contemplated to be within the scope of the present disclosure. Formulations made using other thermoplastic polymers/resins in other applications or products are also contemplated to be within the scope of the present disclosure. Such applications may include but not be limited to automotive products, building materials, flooring, household or kitchen items, medical or office supply products, apparel, or packaging for personal care or other consumer products. It should be understood that throughout the description, corresponding reference numerals indicate like or corresponding parts and features.

The present disclosure generally provides a foamed polyvinyl chloride (PVC), foamed PVC alloy, or other foamed thermoplastic resin component that comprises a blend of functionalized and non-functionalized process aids and that exhibits reduced density compared to a similar foamed component made using only the non-functionalized process aid but no functionalized process aid. More specifically, the foamed PVC, foamed PVC alloy, or other thermoplastic resin component comprises polyvinyl chloride (PVC) or other thermoplastic resin and a process aid blend. The process aid blend comprises, consists essentially of, or consists of from 1% by weight to 60% by weight, based on weight Q, of a functionalized process aid, and from 99% by weight to 40% by weight, based on weight Q, of a non-functionalized process aid. The functionalized process aid comprises, consists essentially of, or consists of at least one base polymer which is functionalized with from 0.1 wt. % to 35 wt. % of a reactive epoxy, hydroxyl, β-keto ester, β-keto amide, or carboxylic acid functional group based on the total weight of the functionalized process aid. The non-functionalized process aid is not particularly limited, but it does not contain any reactive epoxy, hydroxyl, β-keto ester, β-keto amide, or carboxylic acid functional groups. The foamed PVC component comprising the process aid blend has a lower density than a reference foamed PVC component comprising 100% by weight, based on the weight Q, of the non-functionalized process aid, wherein the foamed PVC component comprising the weight Q of the process aid blend and the reference foamed PVC component comprising 100% by the weight Q of the non-functionalized process aid were made using the same process conditions and additives.

The blend of the functionalized process aid (f-PA), and the non-functionalized process aid (PA), surprisingly decreases the density, improves the cell structure, morphology, and appearance of the resulting foam, and maintains or may even improve the mechanical properties exhibited by the foamed PVC or other thermoplastic resin component, when compared to a foamed component made using the same processing conditions, blowing agent, etc., but which comprises only the non-functionalized process aid and no functionalized process aid. Further, the cell structure, morphology, and appearance for foams made using the blend of functionalized and non-functionalized process aids are surprisingly better than similar foams made in an identical process, but which comprise only the functionalized process aid and no non-functionalized process aid. Thus, the blend of functionalized process aid and non-functionalized process aid as disclosed herein surprisingly produces a better foamed PVC component in terms of at least one of reduced density, improved cell structure, improved cell morphology, and improved cell appearance than either process aid used alone. Further, the PVC or PVC alloys comprising the blend of functionalized and non-functionalized process aids exhibit improved melt viscosity and melt strength that contribute to the lower density and improved cellular structure of foams produced thereof compared to such foams made with only the non-functionalized process aid.

The mechanical properties and melt rheology that remain substantially unaffected or become enhanced upon addition of the blend of the process aid include, without limitation, impact properties and density, as well as the parameters associated with the processability (e.g., extrusion) of the foamable PVC or other thermoplastic resin formulation.

According to another aspect of the present disclosure, the reduction in density of a foamed PVC component comprising the functionalized and non-functionalized process aid blend as compared to a similar foamed PVC component with only non-functionalized process aids and not comprising any functionalized process aid may alternatively be characterized as having a density that is least 2 percent lower (e.g. 0.1 g/cc based on product 0.5 g/cc in density) for the composition comprising the process aid blend.

Process Aid Blend

Without wishing to be bound by theory, it may be that the functionalized process aids in the process aid blend to be used in foamed polyvinyl chloride processing defined herein have different effects on the polyvinyl chloride matrix as compared to conventional non-functionalized process aids that also are included in the process aid blend.

The functionalized process aids in the blend of process aids comprise acrylic polymers or copolymers synthesized with reactive epoxy, hydroxyl, β-keto ester, β-keto amide, or carboxylic acid functional groups. An example of a method capable of forming the foamed PVC or other thermoplastic resin component includes, without limitation, an extrusion process. The PVC or PVC alloys comprising the blend of functionalized and non-functionalized process aids thus may exhibit substantially the same or even increased melt viscosity and increased melt strength that may contribute to the lower density and improved cellular structure of foams produced thereof compared to such foams made with only the non-functionalized process aid.

The non-functionalized process aids used in the process aid blend which is foamed or foamable polyvinyl chloride (PVC) formulations are typically comprised of acrylate and methacrylate monomers, which are not reactive during such processing. The non-functionalized process aids in the process aid blend may also comprise conventional process aids such as are known and used in the art of processing PVC and foamed PVC. Non-limiting examples are chlorinated polyethylene (PE-C), polyolefin-based process aids (e.g. oxidized polyethylene), EVA-based polymers, polyester-based polymers (e.g. Elvaloy® (Dow Chemical) which is a ketone ethylene ester), ABS, and/or styrenic polymers.

The functionalized process aids of the process aid blend of the present disclosure may be made according to any method known in the art, including, but not limited to, emulsion polymerization. Likewise, the non-functionalized process aids of the process aid blend of the present disclosure may be made according to any method known in the art, including, but not limited to, emulsion polymerization.

The process aids, either functionalized or non-functionalized, may be comprised of "acrylic" polymers or copolymers as the base polymer thereof, with a variety of different compositions and molecular weights. They may be higher in molecular weight than the PVC resin or other thermoplastic resin. In PVC resin specifically, because they are very compatible with the PVC resin, these process aids (functionalized or non-functionalized) may assist with interparticle mixing of the PVC particles at the beginning stages of fusion, i.e., melting of the polymer pellets or particles at the beginning of the forming process, e.g. the feed section of an extruder.

The functionalized process aids of the process aid blend of the present disclosure may have a weight average molecular weight (also called molar mass ($M_w$)) that is greater than about 50,000 g/mol; alternatively, the weight average molecular weight of the process aids is greater than about 100,000 g/mol; alternatively, the molecular weight ($M_w$) of the process aids is about 250,000 g/mol or greater; alternatively, the ($M_w$) soluble fraction of the process aids is between about 50,000 g/mol to about 15 million g/mol, alternatively between about 750,000 g/mol to about 12 million g/mol. The weight average molecular weight of the functionalized process aids may be 60,000 g/mol, 70,000 g/mol, 80,000 g/mol, 90,000 g/mol, 100,000 g/mol, 150,000 g/mol, 200,000 g/mol, 250,000 g/mol, 300,000 g/mol, 350,000 g/mol, 400,000 g/mol, 450,000 g/mol, 500,000 g/mol, 550,000 g/mol, 600,000 g/mol, 650,000 g/mol, 700,000 g/mol, 750,000 g/mol, 800,000 g/mol, 850,000 g/mol, 900,000 g/mol, 950,000 g/mol, 1,000,000 g/mol, 1,500,000 g/mol, 2,000,000 g/mol, 2,500,000 g/mol, 3,000,000 g/mol, 3,5000,000 g/mol, 4,000,000 g/mol, 4,500,000 g/mol, 5,000,000 g/mol, 5,500,000 g/mol, 6,000,000 g/mol, 6,500,000 g/mol, 7,000,000 g/mol, 7,500,000 g/mol, 8,000,000 g/mol, 8,500,000 g/mol, 9,000,000 g/mol, 9,500,000 g/mol, 10,000,000 g/mol, 10,500,000 g/mol, 11,000,000 g/mol, 11,500,000 g/mol, or 12,000,000 g/mol.

The weight average molecular weight may be measured by any known method including but not limited to gel permeation chromatography (GPC). The upper end of the molecular weight measurement may be affected by the occurrence of crosslinking between polymeric process aids.

The molecular weight of the soluble portion of the process aids may be determined using gel permeation chromatography (GPC) by various known methods and procedures. One such method utilizes a differential refractometer equipped with two PL gel mixed A columns and a guard column. An injection volume of 150 microliters of the soluble portion of the process aids as a THF solution with a concentration of 0.5 mg/mL is injected into the column at a temperature of 35° C. The elution of the process aids through the column is performed using a flow rate of 1.0 mL/min of the THF solvent (HPLC grade). Each sample of the process aids is tested in an unfiltered state. The chromatograms for each tested sample are obtained and analyzed with the molar mass values being calculated relative to a poly(methyl methacrylate), PMMA, calibration curve. Further information regarding GPC methodology is found in ASTM D4001-13 (ASTM International, West Conshohocken, PA).

A total of three injections for each sample was averaged to obtain the average molecular weight (Mw). The average molecular weight (Mw) for the tested samples ranged from about 50,000 g/mol to about 5 million g/mol. The polydispersity, which is defined as being the ratio of weight average to number average molecular weight (Mw/Mn), for each tested sample was measured to be between about 10 to about 20.

In one embodiment, the functionalized process aids of the invention surprisingly exhibit insolubility in organic solvents. In other words, the functionalized process aids of the invention can have soluble and insoluble fractions. In this case the molecular weight of the insoluble fraction is considered infinite and cannot be measured by GPC. The molecular weight of the soluble fraction, however, can be measured. The molecular weight ranges for the soluble fraction can range from 500 g/mol up to approximately 10 million g/mol, from 0.5 million up to approximately 7 million g/mol, from 0.5 million up to approximately 6 million g/mol, or from 0.5 million up to approximately 5 million g/mol. The soluble and insoluble fractions of the process aids may be determined through the use of an extraction technique with a solvent, such as acetone, tetrahydrofuran (THF), or methyl ethyl ketone (MEK). The insoluble fraction of the process aids ranges from 1% to about 95% (by weight), 10% to about 90%, 40% to about 90%, 50% to about 90%, 60% to about 90%, or 60% to about 85%. Alternatively, the insoluble fraction ranges from about 2% to about 70%; or from about 4% to about 55%, preferably from about 10 to 50%, more preferably about 20 to 45%, even more preferably about 25 to 40%.

The functionalized process aids exhibit a glass transition temperature ($T_g$) that is greater than or equal to 0° C. and up to about 150° C.; alternatively, the $T_g$ of the process aids is within the range of about 60° C. to about 125° C., preferably from about 60° C. to about 85° C. The $T_g$ of the process aids can be measured either as powders or pressed bars formed from said powders using any known method, including differential scanning calorimetry (DSC).

Each DSC measurement is obtained over the temperature range of −75° C. to 160° C. using a heating rate of 20° C./minute and a cooling rate of 10° C./minute. The Tg is determined as an average of at least two measurements obtained for each sample formulation. Further description of DSC methodology is found in ASTM E1356-08(2014) (ASTM International, West Conshohocken, PA). The glass transition temperature (Tg) of the process aids can be determined either as a powder or as a bar formed from powder. The powder may be pressed into a bar upon being subjected to an elevated temperature (e.g., 215° C.) under high pressure (e.g., 25 tons).

The functionalized process aids comprise a base polymer or copolymer derived from ethylenically unsaturated monomers, including without limitation, vinyl- and (meth)acrylic-containing monomers, such as linear or branched alkyl esters of acrylic or methacrylic acid; styrene and styrene derivatives; olefins, such as ethylene; dienes, such as butadiene; and mixtures thereof, with linear or branched alkyl esters of acrylic or methacrylic acid being preferred. Several specific examples of vinyl- and (meth)acrylic-containing monomers, include, but are not limited to, methyl(meth)acrylate, ethyl(meth)acrylate, n-butyl(meth)acrylate (BMA), 2-ethylhexyl(meth)acrylate, and mixtures thereof, with methyl(meth)acrylate and ethyl(meth)acrylate preferred. Alternatively, the base polymer or copolymer of the functionalized process aids may be poly(methyl methacrylate), poly(butyl acrylate), poly(ethyl acrylate), poly(methyl methacrylate-styrene) copolymer, or a mixture thereof. Alternatively, the base polymer of the functionalized process aids comprises preferred poly(methyl methacrylate) for compatibility with the PVC matrix. When desirable, other acrylates, such as poly(butyl acrylate) or poly(ethyl acrylate), can be added at a level of 10-30 wt. % to control the glass transition temperature ($T_g$) and fusion properties of the functionalized process aid.

In one embodiment the base polymer is functionalized with glycidyl(meth)acrylate. In one embodiment, the base polymer is functionalized with a reactive epoxy functional group derived from glycidyl methacrylate, or glycidyl acrylate, or mixtures thereof.

The functionalized process aid used in the process aid blend added to the PVC or other thermoplastic resin formulation to form a foamed PVC or other foamed thermoplastic resin component is functionalized with about 0.1 wt. % to about 35 wt. % of a reactive epoxy, hydroxyl, β-keto ester, β-keto amide, or carboxylic acid functional group, or mixture thereof, based on the total weight of the functionalized process aid. Alternatively, the loading of the reactive group functionalization in the functionalized process aid is between about 1 wt. % and about 25 wt. %; alternatively, the functionalized process aid includes at least between about 1 wt. % and about 20 wt. %, or preferably between 2% and about 20%, or preferably at least between about 3 wt. % to about 20 wt. %, and more preferably about 5 wt. % to about 10 wt. % of the reactive functional groups based on the total weight of the functionalized process aid. The functionalized process aid may include at least about 0.1 wt. %, or about 0.2 wt. %, or about 0.3 wt. %, or about 0.4 wt. %, or about 0.5 wt. %, or about 0.6 wt. %, or about 0.7 wt. %, or about 0.8 wt. %, or about 0.9 wt. %, or about 1.0 wt. %, or about 1.5 wt. %, or about 2.0 wt. %, or about 2.5 wt. %, or about 3.0 wt. %, or about 3.5 wt. %, or about 4.0 wt. %, or about 4.5 wt. %, or about 5.0 wt. %, or about 6.0 wt. %, or about 7.0 wt. %, or about 8.0 wt. %, or about 9.0 wt. %, or about 10.0 wt. %, or about 11.0 wt. %, or about 12.0 wt. %, or about 13.0 wt. %, or about 14.0 wt. %, or about 15.0 wt. %, or about 16, or about 17, or about 18 wt. %, or about 19 wt. %, or about 20.0 wt. %, or about 21.0 wt. %, or about 22.0 wt. %, or about 23.0 wt. %, or about 24.0 wt. %, or about 25.0 wt. %, or about 26.0 wt. %, or about 27.0 wt. %, or about 28.0 wt. %, or about 29.0 wt. %, or about 30.0 wt. %, or about 31.0 wt. %, or about 32.0 wt. %, or about 33.0 wt. %, or about 34.0 wt. %, or about 35 wt. % of the reactive functional groups (or mixture of such groups) based on the total weight of the functionalized process aid.

The ratio of the weights of the functionalized process aid to the non-functionalized process aid to the in the total amount of process aid blend used in the composition may range from 1:99 to about 60:40; alternatively about 2:98; or about 3:97; or about 4:96; or about 5:95; or about 6:94; or about 7:93; or about 8:92; or about 9:99; or about 10:90; or about 11:89; or about 12:88; or about 13:87; or about 14:86; or about 15:85; or about 16:84; or about 17:83; or about 18:82; or about 19:81; or about 20:80; or about 21:79; or about 22:78; or about 23:77; or about 24:76; or about 25:75; or about 26:74; or about 27:73; or about 28:72; or about 29:71; or about 30:70; or about 31:69; or about 62:78; or about 63:67; or about 34:66; or about 35:65; or about 36:64; or about 37:63; or about 38:62; or about 39:61; or about 40:60; or about 41:59; or about 42:58; or about 43:57; or about 44:56; or about 45:55; or about 46:54; or about 47:53; or about 48:52; or about 49:51 or about 50:50; or about 51:49 or about 52:48; or about 53:47; or about 54:46; or about 55:45; or about 56:44 or about; 57:43; or about 58:42; or about 59:41; or about 60:40.

The functionalized and non-functionalized process aids in the process aid blend may be used in powder or particle or pelletized form or combinations thereof. The process aid blends may be co-spray dried blends of the functionalized and non-functionalized process aids. The process aid blend may be a melt-blended and pelletized or powdered mixture of each of the functionalized and non-functionalized process aids in the relative proportions as disclosed herein. The process blend may also be a dry blend of pellets or particles or powders of each of the functionalized and non-functionalized process aids in the relative proportions as disclosed herein. In an embodiment, the process aid blend as disclosed herein may be provided as a stand-alone product that may be mixed or blended with a PVC or other thermoplastic resin, as for instance in the hopper of an extruder.

The powder or particles comprising the functionalized process aid may be solid particles that comprise a base polymer that is substantially functionalized with the reactive groups or the functionalized process aid may comprise pseudo core-shell particles. The functionalized process aids (f-PA) may be prepared in a multi-step polymerization process such that the functionalized process aids resemble pseudo core-shell particles that comprise a core made of non-functionalized base polymer with at least part of said core being encapsulated with a shell that includes reactive epoxy, hydroxyl, or carboxylic acid functional groups, which would also be in the form of a process aid blend.

The reactive epoxy, hydroxyl, or carboxylic acid groups of the functionalized process aid may be derived from the addition of epoxy, hydroxyl, β-keto ester, β-keto amide, or carboxylic acid containing monomers or a mixture of such monomers to the base polymer. Examples of such monomers include, but are not limited to, hydroxyl-substituted alkyl esters of (meth)acrylic acid, such as 2-hydroxyethyl(meth)acrylate; β-keto esters of (meth)acrylic acids; β-keto amides of (meth)acrylic acids; vinyl esters of linear or branched carboxylic acids, such as vinyl valerate, unsaturated carboxylic acids, including unsaturated $C_3$-$C_6$ monocarboxylic acids, such as acrylic acid (AA), and unsaturated $C_4$-$C_6$ dicarboxylic acids, such as maleic acid and itaconic acid; and epoxy group-containing monomers, such as glycidyl acrylate or glycidyl methacrylate (GMA). Unsaturated $C_3$-$C_6$ monocarboxylic acids, such as acrylic acid (AA), and unsaturated $C_4$-$C_6$ dicarboxylic acids, such as maleic acid and itaconic acid; and epoxy group-containing monomers, such as glycidyl acrylate or glycidyl methacrylate (GMA) are preferred, with acrylic acid, glycidyl acrylate, and glycidyl methacrylate (GMA) being more preferred. Alternatively, the functional groups may be incorporated into the base polymer of the process aids through the addition of acrylic acid (AA), glycidyl methacrylate (GMA), which are most preferred, or a mixture thereof. The functionalized process aid may also be prepared by a method comprising a step of polymerizing at least one functionalized monomer comprised of at least one functional group selected from the group consisting of hydroxyl functional groups, epoxy functional groups, β-keto ester functional groups, β-keto amide functional groups and carboxylic acid functional groups, optionally together with one or more non-functionalized monomers. The functionalized process aid may also be prepared by a method comprising polymerizing at least one monomer comprised of at least one functional group that is a precursor to a functional group selected from the group consisting of hydroxyl functional groups, epoxy functional groups, β-keto ester functional groups, β-keto amide functional groups and carboxylic acid functional groups to obtain a polymeric process aid precursor comprising the at least one functional group that is a precursor to a functional group selected from the group consisting of hydroxyl functional groups, epoxy functional groups, β-keto ester functional groups, β-keto amide functional groups and carboxylic acid functional groups and converting at least a portion of the at least one functional group that is a precursor to a functional group selected from the group consisting of hydroxyl functional groups, epoxy functional groups, β-keto ester functional groups, β-keto amide functional groups and carboxylic acid functional groups in the polymeric process aid precursor to at least one functional group selected from the group consisting of hydroxyl functional groups, epoxy functional groups, β-keto ester functional groups, β-keto amide functional groups and carboxylic acid functional groups to obtain a functionalized process aid.

The amount of the process aid blend present in the foamed or foamable PVC formulation may range from about 0.1 phr to about 15 phr in PVC formulations or 0.1 to about 25 phr in other thermoplastic resin components; alternatively, from about 0.1 phr to about 10 phr in PVC formulations or 0.1 to about 10 phr in other thermoplastic resin components; alternatively, greater than or equal to 1 phr. In the context of the present disclosure, the term "phr" means parts per hundred parts of the total resin blend excluding the plastic additive polymer (e.g., PVC plus non-PVC polymer, where the PVC/non-PVC blend equals 100 phr). The amount of the process aid blend present in the PVC or other thermoplastic resin formulation may also be expressed as a weight percentage based on the total weight of the PVC or other thermoplastic resin formulation. The use level of the process aid blend in the PVC formulation may vary depending on the type of PVC formulation selected and the specification set forth for the application in which the foamed PVC or other foamed thermoplastic resin component will be utilized. In other words, the amount of the process aid blend in the formulation may be predetermined based on the use level necessary to effect the density, and cell morphology requirements for a given application utilizing a foamed component (e.g., siding, window profile, pipe, or foamed sheet, among others).

Without being bound to any theory, the process aid blend may promote fusion of the PVC resin by altering the melt rheology of the PVC formulation during extrusion or other processing operation in which heat is applied. The process aid blend also may assist with controlling the viscosity of the melt, enhancing mixing of the components as melting of the PVC resin occurs, improving the strength and extensibility of the melted polymer blend, and controlling the volume increase or swelling that occurs immediately after the melted polymer blend leaves the die opening (including but limited to die swell as the extruded part is foamed), and reducing the occurrence of plate out and crystallinity, as well as improving long-term impact strength and weatherability.

The process aid blend comprising the functionalized and non-functionalized process aids may increase the melt elongation/extensibility and elasticity of the melted polymer blend. The process aid blend may also increase the initial melt strength of the melted polymer blend. These two properties together (i.e., a combination of high melt strength and high elongation before break) are known to contribute to improved characteristics, e.g. cell structure, cell appearance and cell morphology, of a foamed component. These characteristics of the polymeric foam contribute to reduced foam density, as well improved mechanical properties and the ability of the composition to accept high levels of fillers. In general, the process aid blend disclosed herein comprising a functionalized process aid with a higher weight average molecular weight may tend to lead to a higher level of die swell. A higher level of die swell may be beneficial when making a foamed PVC component. The cellular morphology, i.e., size and range of sizes of the cells that comprise the foam in the foamed component is impacted by the relative amounts of the functionalized and non-functionalized process aids in the process aid blend. In other thermoplastic resins as well as in PVC, the amount of the functionalized process aid may reduce gloss.

Polyvinylchloride (PVC) Resin

The PVC resin used to produce the foamed component and that is combined with the process aid blend disclosed herein may be produced at a number of different molecular weights using any method known in the art, including, but not limited to solution, suspension, or emulsion polymerization. The PVC resin may include, but not be limited to, rigid PVC resins, flexible PVC resins, PVC plastisols, as well as mixtures or combinations of PVC formed with one or more other thermoplastic and/or thermoset resins. The PVC resin may be characterized by its molecular weight, which is commonly reported as inherent viscosity (IV) or K-value. In general, the higher the IV or K-value of the PVC resin, the greater the impact strength of the PVC or other thermoplastic resin component made therefrom. However, PVC resins having a high molecular weight are also more difficult to achieve fusion and polymer flow without the use of excessive heat or shear. The molecular weight of the PVC resin used in the formulation from which a PVC component is made can be predetermined based on the mechanical properties and economic factors desired for the final product. Typically, resins within the K-value range of about 56 to about 72; alternatively, about 63 to about 67; alternatively, about 65 are used for forming PVC components having a rigid profile with lower molecular weights being used for foam applications. The molecular weight of the PVC resin is generally less than the molecular weight of the process aids used therewith. The amount of the PVC resin used in the formulation to form the foamed PVC or other thermoplastic resin component may range from about 20 wt. % to about 90 wt. %, 30 wt. % to about 85 wt. %, 40 wt. % to about 85 wt. %, or from about 50 wt. % to about 80 wt. %, of the entire PVC formulation.

Other Thermoplastics

Other thermoplastics useful to be blended with the PVC to form a PVC blend or alloy to form the foamed PVC component in the present invention include but not are limited to acrylic polymers, styrenic polymers, polyolefins, polycarbonate (PC), polyurethane (PU), polyvinylidine fluoride polymers (PVDF), polylactic acid (PLA), and the like, and mixtures thereof. Such other thermoplastics as described herein may be combined with PVC, or used in any combination thereof with or without PVC, and further including the process aid blends of the invention to form a foamed component with reduced density and improved cell structure, appearance and morphology compared to such a component that includes only the non-functionalized process aid in the process aid blend but no functionalized process aid. These other thermoplastics may be included in the PVC composition at 50 wt. % or less, as a wt. percentage of the total (non-process aid) resin in the blend.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenated derivatives, styrene-isoprene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight.

The styrenic polymers can also be blended with other polymers to form compatible blends. Examples include ASA blended with PVC, and SAN blended with PMMA. Acrylic polymers, as used herein, include but are not limited to, homopolymers, copolymers and terpolymers comprising alkyl (meth)acrylates. The alkyl (meth)acrylate monomer is preferably methyl methacrylate, which may make up from 60 to 100 weight percent of the monomer mixture. Zero to 40 weight percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 wt. percent of one or more $C_{1-4}$ acrylates.

The thermoplastic polymers of the invention can be manufactured by any means known in the art, including emulsion polymerization, solution polymerization, and suspension polymerization. In one embodiment, the non-PVC thermoplastic in the matrix has a weight average molecular weight of between 50,000 and 500,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

Especially preferred thermoplastics for the matrix polymer are styrenic polymers (including SAN, ABS, MABS, ASA, HIPS), acrylic, and PVDF polymers.

Impact Modifiers

When desirable, the PVC formulation used to form the foamed PVC or other thermoplastic resin component may optionally include at least one impact modifier. Impact modifiers enhance the toughness and the resistance of the final foamed product towards cracking or shattering during any subsequent manufacturing operations that are performed on the foamed PVC or other thermoplastic resin component, such as cutting or punching holes in the profile of the foamed component. Impact modifiers typically function by absorbing energy and/or dissipating the energy of a propagating crack. The impact modifiers may include any compatible polymeric particles, including block copolymers and "core-shell particulate" polymers having a soft rubbery core (Tg<0° C.) or hard core (Tg>0° C.) with limited compatibility with the PVC resin and a grafted, compatible, outer polymeric shell. The polymeric particles or compatible outer polymeric shell may comprise methacrylate/butadiene/styrene (MBS), acrylic polymers (e.g., known as acrylic impact modifiers [AIM]), or acrylate/butadiene/methacrylate, and acrylonitrile/butadiene/styrene (ABS); semi-compatible polymers, such as polymers of chlorinated polyethylene (CPE) and acrylic-grafted CPE, and ethylene-vinyl acetate (EVA); and other polymers, such as terpolymers of ethylene/vinyl acetate/carbon monoxide, ethylene/propylene/carbon monoxide, polymers of olefins with acrylates, various copolymers of butadiene with acrylonitrile, methacrylates or other rubbers, and even polysiloxane enhanced materials. Preferred shells comprise polymethylmethacrylate (PMMA).

Fillers

The PVC or other thermoplastic resin formulation used to form the foamed PVC component may also optionally or preferably comprise one or more inorganic fillers or particles, pigments, lubricants, stabilizers, or other desired additives. The inclusion of the process aid blend may enhance the ability of the PVC composition to accept higher loading levels of fillers. For example, ultrafine $CaCO_3$ particles may be used as a filler to enhance low temperature impact resistance and increase UV stability in rigid foamed PVC products. Synthetic amorphous silica particles may be incorporated into a PVC formulation to also enhance impact resistance and to provide improved flow properties. Other solid fillers, including, but not limited to, kaolin clay, talc, mica, wollastonite, and calcium metasilicate, may also be incorporated into the formulation simply to reduce the cost of the formulation without substantially affecting the properties exhibited by the foamed PVC or other foamed thermoplastic resin component. The range of filler in the foam may be from about 5 phr to about 150 phr.

Other Additives

Various pigments may be included to provide color to the foamed PVC component or other foamed thermoplastic resin component. These pigments generally exhibit stability at elevated temperatures and to the presence of hydrogen chloride. These pigments may include without limitation various organic pigments or ceramic pigments, such as titanium dioxide and other metal oxides, with or without a silica or alumina surface treatment.

Various lubricants may be included in a PVC formulation in relatively small amounts in order to reduce the resistance to flow of the polymer chains and other ingredients that are present. These lubricants may act as an external lubricant or metal release (slip) agent that enhances the flow of the "hot" material through the polymer processing equipment or as an internal lubricant that reduces the melt viscosity of the material being processed. Lubricants are the main additional component that may be added to the formulation that can help facilitate or drive the fusion of the PVC resin. Several examples of lubricants include without limitation, paraffin waxes and long chain carboxylic acids or their esters, amides, and salts. The amount of lubricant utilized is typically below the level that will cause the occurrence of "plate out". Plate out occurs when the lubricants present in the formulation are squeezed out of the hot bulk material as the extrudate is leaving the die or going through a vacuum calibrator, thereby either causing a plug or deposit of material to occur.

Various stabilizers may be included in a PVC formulation or other thermoplastic formulation to enhance resistance of the foamed component to heat or UV light, to name a few. The heat stabilizers may include, but not be limited to, lead-based or organotin compounds, mixed metal stabilizers, or organic stabilizers, such as epoxides. The UV stabilizers may include, without limitation, hindered amines or phenols.

Non-limiting aspects of the invention may be summarized as follows:

Aspect 1: A foamed polyvinyl chloride (PVC) component comprising:
  a) a PVC resin;
  b) a weight Q in parts per hundred (phr) of the PVC resin of a process aid blend, wherein the process aid blend comprises from 1% by weight to 60% by weight, based on weight Q, of a functionalized process aid, and from 99% by weight to 40% by weight based on weight Q, of a non-functionalized process aid,
  wherein the functionalized process aid comprises at least one base polymer which is functionalized with from 0.1 wt. % to 35 wt. % of a reactive epoxy, hydroxyl, β-keto ester, β-keto amide, or carboxylic acid functional group or mixture thereof based on the total weight of the functionalized process aid;
  and the foamed PVC component comprising the process aid blend has a lower density than a reference foamed PVC component comprising 100% by weight, based on weight Q, of the non-functionalized process aid and wherein the foamed PVC component comprising the weight Q of the process aid blend and the reference foamed PVC component comprising 100% by the weight Q of the non-functionalized process aid are made using the same process conditions and additives.

Aspect 2: The foamed PVC component according to Aspect 1, wherein the process aid blend comprises from 1% by weight to 25% by weight, based on the weight Q, of the functionalized process aid, and from 99% by weight to 75% by weight, based on the weight Q, of the non-functionalized process aid.

Aspect 3: The foamed PVC component according to either of Aspect 1 or Aspect 2, wherein the functionalized process aid comprises at least 1% by weight of the reactive functional group.

Aspect 4: The foamed PVC component according to any of Aspects 1-3, wherein the functionalized process aid comprises at most 25% by weight of the reactive functional group.

Aspect 5: The foamed PVC component according to any of Aspects 1-4, wherein the weight Q is from 0.1 to 15 parts per hundred (phr) by weight of the PVC resin.

Aspect 6: The foamed PVC component according to any of Aspects 1-5, wherein the foamed PVC component comprising the process aid blend has a density that is at least 2 percent less than the density of the reference foamed PVC component.

Aspect 7: The foamed PVC component according to any of Aspects 1-6, wherein the base polymer of the functionalized process aid is derived from one or more monomers comprising (meth)acrylic-containing monomers.

Aspect 8: The foamed PVC component according to any of Aspects 1-7, wherein the base polymer of the functionalized process aid is derived from i) one or more monomers comprising (meth)acrylic-containing monomer and ii) at least one monomer selected from the group consisting of vinyl-containing monomers, styrene and styrene derivatives, olefins, dienes, and mixtures thereof.

Aspect 9: The foamed PVC component according to any of Aspects 1-8, wherein the reactive epoxy, hydroxyl, β-keto ester, β-ketoamide, or carboxylic acid functional group is derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; β-keto esters of (meth)acrylic acids; β-keto amides of (meth)acrylic acids; epoxy group-containing monomers; or mixtures thereof.

Aspect 10: The foamed PVC component according to any of Aspects 1-9, wherein the base polymer is functionalized with a reactive epoxy functional group derived from glycidyl methacrylate, or glycidyl acrylate, or mixtures thereof.

Aspect 11: The foamed PVC component according to any of Aspects 1-10, wherein the non-functionalized process aid comprises an acrylic polymer or an acrylic copolymer.

Aspect 12: The foamed PVC component according to any of Aspects 1-11, wherein the functionalized process aid has a weight average molecular weight of at least 50,000 g/mol.

Aspect 13: The foamed PVC component according to any of Aspects 1-12, wherein the non-functionalized process aid comprises a polymer.

Aspect 14: The foamed PVC component according to any of Aspects 1-13, wherein the non-functionalized process aid comprises chlorinated polyethylene (PE-C).

Aspect 15: The foamed PVC component according to any of Aspects 1-14, wherein the foamed PVC component is a building material or flooring.

Aspect 16: A method of making a foamed polyvinyl chloride (PVC) component, wherein the method comprises combining:
  a) a polyvinyl chloride (PVC) resin;
  b) a weight Q in parts per hundred (phr) of the PVC resin of a process aid blend, wherein the process aid blend comprises from 1% by weight to 60% by weight, based on weight Q, of a functionalized process aid, and from 99% by weight to 40% by weight, based on weight Q, of a non-functionalized process aid; and
  c) a blowing agent (BA);
to form a foamable PVC composition; and
processing the foamable PVC composition to form the foamed PVC component;
wherein the functionalized process aid comprises at least one base polymer which is functionalized with from 0.1 wt. % to 35 wt. % of a reactive epoxy, hydroxyl, β-keto ester, β-keto amide, or carboxylic acid functional group, or mixture thereof based on the total weight of the functionalized process aid;
and the foamed PVC component comprising the process aid blend has a lower density than a reference foamed PVC component comprising 100% by the weight Q of the non-functionalized process aid and wherein the foamed PVC component comprising the weight Q of the process aid blend and the reference foamed PVC component comprising 100% by weight, based on weight Q, of the non-functionalized process aid are made using the same process conditions and additives.

Aspect 17: The method according to Aspect 16, wherein the process aid blend comprises from 1% by weight to 24% by weight, based on the weight Q, of the functionalized process aid, and from 99% by weight to 76% by weight, based on the weight Q, of the non-functionalized process aid.

Aspect 18: The method of making a foamed polyvinyl chloride (PVC) component according to any of Aspects 16 or 17, wherein the functionalized process aid comprises at least 1% by weight of the reactive functional group.

Aspect 19: The method of making a foamed PVC component according to any of Aspects 16-18, wherein the functionalized process aid comprises at most 25% by weight of the reactive functional group.

Aspect 20: The method of making a foamed PVC component according to any of Aspects 16-19, wherein the weight Q is from 0.1 to 15 parts per hundred (phr) by weight of the PVC resin.

Aspect 21: The method of making a foamed PVC component according to any of Aspects 16-20, wherein the foamed PVC component comprising the process aid blend has a density that is at least 2 percent less than the density of the reference foamed PVC component.

Aspect 22: The method of making a foamed PVC component according to any of Aspects 16-21, wherein the base polymer of the functionalized process aid is derived from one or more monomers comprising (meth)acrylic-containing monomers.

Aspect 23: The method of making a foamed PVC component according to any of Aspects 16-23, wherein the base polymer of the functionalized process aid is derived from i) one or more monomers comprising (meth)acrylic-containing monomer and ii) at least one monomer selected from the group consisting of vinyl-containing monomers, styrene and styrene derivatives, olefins, dienes, and mixtures thereof.

Aspect 24: The method of making a foamed PVC component according to any of Aspects 16-23, wherein the reactive epoxy, hydroxyl, l3-keto ester, β-ketoamide, or carboxylic acid functional group is derived from hydroxyl-substituted alkyl esters of (meth)acrylic acid; vinyl esters of linear or branched carboxylic acids; unsaturated $C_3$-$C_6$ monocarboxylic acids and unsaturated $C_4$-$C_6$ dicarboxylic acids; β-keto esters of (meth)acrylic acids; β-keto amides of (meth)acrylic acids; epoxy group-containing monomers; or mixtures thereof.

Aspect 25: The method of making a foamed PVC component according to any of Aspects 16-24, wherein the base polymer is functionalized with a reactive epoxy functional group derived from glycidyl methacrylate, or glycidyl acrylate, or mixtures thereof.

Aspect 26: The method of making a foamed PVC component according to any of Aspects 16-25, wherein the non-functionalized process aid comprises an acrylic polymer or an acrylic copolymer.

Aspect 27: The method of making a foamed PVC component according to any of Aspects 16-26, wherein the functionalized process aid has a weight average molecular weight of at least 50,000 g/mol.

Aspect 28: The method of making a foamed PVC component according to any of Aspects 16, wherein the non-functionalized process aid comprises a polymer.

Aspect 29: The method of making a foamed PVC component according to any of Aspects 16-28, wherein the non-functionalized process aid comprises chlorinated polyethylene (PE-C).

Aspect 30: The method of making a foamed PVC component according to any of Aspects 16-29, wherein the foamed PVC component is a building material.

Aspect 31: A process aid blend, wherein the process aid blend comprises from 1% by weight to 60% by weight, of a functionalized process aid, and from 99% by weight to 40% by weight of a non-functionalized process aid,
wherein the functionalized process aid comprises at least one base polymer which is functionalized with from 0.1 wt. % to 35 wt. % of a reactive epoxy, hydroxyl, β-keto ester, β-keto amide, or carboxylic acid functional group or mixture thereof based on the total weight of the functionalized process aid.

Aspect 32: The process aid blend according to Aspect 31, wherein the process aid blend comprises from 1% by weight to 24% by weight of the functionalized process aid, and from 99% by weight to 76% by weight of the non-functionalized process aid.

Aspect 33: The process aid blend according to either of Aspect 31 or Aspect 32, wherein the reactive functional group comprises at least 1% by weight of the functionalized process aid.

Aspect 34: The process aid blend according to any of Aspects 31-33, wherein the reactive functional group comprises at most 25% by weight of the functionalized process aid.

Aspect 35: The process aid blend according to any of Aspects 31-34, wherein the base polymer of the functionalized process aid is derived from one or more monomers comprising (meth)acrylic-containing monomers.

Aspect 36: The process aid blend according to any of Aspects 31-35, wherein the base polymer of the functionalized process aid is derived from i) one or more monomers comprising (meth)acrylic-containing monomer and ii) at least one monomer selected from the group consisting of vinyl-containing monomers, styrene and styrene derivatives, olefins, dienes, and mixtures thereof.

Aspect 37: The process aid blend according to any of Aspects 31-36, wherein the reactive epoxy, hydroxyl, β-keto ester, β-ketoamide, or carboxylic acid functional group is derived from hydroxyl-substituted alkyl esters of (meth) acrylic acid; vinyl esters of linear or branched carboxylic acids; unsaturated $C_3$-$C_6$ monocarboxylic acids and unsaturated $C_4$-$C_6$ dicarboxylic acids; β-keto esters of (meth) acrylic acids; β-keto amides of (meth)acrylic acids; epoxy group-containing monomers; or mixtures thereof.

Aspect 38: The process aid blend according to any of Aspects 31-37, wherein the base polymer is functionalized with a reactive epoxy functional group derived from glycidyl methacrylate, or glycidyl acrylate, or mixtures thereof.

Aspect 39: The process aid blend according to any of Aspects 31-38, wherein the non-functionalized process aid comprises an acrylic polymer or an acrylic copolymer.

Aspect 40: The process aid blend according to any of Aspects 31-39, wherein the functionalized process aid has a weight average molecular weight of at least 50,000 g/mol.

Aspect 41: The process aid blend according to any of Aspects 31-40, wherein the non-functionalized process aid comprises a polymer.

Aspect 42: The process aid blend according to any of Aspects 31-41, wherein the non-functionalized process aid comprises chlorinated polyethylene (PE-C).

Aspect 43: A foamable PVC composition comprising:
a) a polyvinylchloride (PVC) resin;
b) a weight Q in parts per hundred (phr) of the PVC resin of a process aid blend, wherein the process aid blend comprises from 1% by weight to 60% by weight, based on weight Q, of a functionalized process aid, and from 99% by weight to 40% by weight, based on weight Q, of a non-functionalized process aid; and
c) a blowing agent (BA);
wherein the functionalized process aid comprises at least one base polymer which is functionalized with from 0.1 wt. % to 35 wt. % of a reactive epoxy, hydroxyl, β-keto ester, β-keto amide, or carboxylic acid functional group, or mixture thereof based on the total weight of the functionalized process aid;
and the foamable PVC composition, when foamed, provides a foamed PVC component having a lower density than a reference foamed PVC component comprising 100% by the weight Q of the non-functionalized process aid and wherein the foamed PVC component and the reference foamed PVC component comprising 100% by weight, based on weight Q, of the non-functionalized process aid are made using the same process conditions and additives.

EXAMPLES

Example 1: Melt Strength Vs. Pull-Off Speed

A PVC formulation shown in Table 1 was blended in a 5 pound (2.27 kg) Henschel mixer with 3 phr of the process aid blends shown in Table 2. The PVC formulation in powder form was then pelletized using a Brabender laboratory scale, conical twin-screw extruder equipped with a pelletizer. The Brabender extruder used a temperature profile for processing and pelletizing as follows: 162° C./164° C./164° C./164° C. (Zone 1/Zone 2/Zone 3/Die), respectively. The extruder screw speed was set to 20 RPM. The resulting PVC compound pellets were used for Rheotens rheology evaluations. Rheotens testing was performed on a Goettfert Rheograph Capillary Rheometer using a 2000 bar transducer. The material was allowed to equilibrate in the test barrel for 5 minutes before testing started. Samples were run using the ridged surface, stainless steel pull-off-wheels. Experimental conditions were as follows. The processing temperature set to 190° C. The die geometry used for the strand extrusion was a 30/2 L/D (mm/mm) die with a 180 degree configuration. The wheel gap was set to 0.2 mm and the wheel acceleration was set at 6 mm/s². The capillary piston diameter was 12 mm with a piston speed of 0.2 mm/s.

The capillary shear rates were thus 28.8 s$^{-1}$. The initial wheel velocity, $V_0$, was 5.2 mm/s.

The resulting curves are shown in FIG. 1. These curves illustrate the effect on initial melt strength and elongation for each process aid blend. This data may be used to estimate "foaming performance", i.e., how well a melt will expand and maintain cell structure when a blowing agent, such as a chemical or physical blowing agent is added to the PVC formulation during extrusion to make foamed PVC components.

TABLE 1

Foam PVC Formulation used for Rheotens Evaluations of Example 1

| Component | Component Detail | phr | grams |
|---|---|---|---|
| PVC resin | Shintech SE750 | 100 | 2500 |
| Stabilizer | PMC Organometallix Thermolite ® 161 | 2 | 50 |
| Paraffin Wax | Honeywell Rheolub ® 165 | 1 | 25 |
| Calcium stearate | Norac COAD ® 10 | 0.7 | 17.5 |
| Oxidized polyethylene | Honeywell A-C ® 629A | 0.2 | 5 |
| High MW process aid | varying | 3 | 75 |
| Lubricating process aid | Arkema, Inc. Plastistrength ® 770 | 1.5 | 37.5 |
| Calcium carbonate | OMYA Omyacarb ® UFT | 10 | 250 |
| Titanium dioxide | Millennium, Inc. RCL-4 | 5 | 125 |
| Total | | 123.4 | 3085 |

TABLE 2

Example 1 Process Aid Blends, wt. ratios added to PVC

| | Weight Ratios in process aid blend | |
|---|---|---|
| Blend | A (acrylic-based non-functionalized process aid) | B (acrylic-based functionalized process aid) |
| 1 (invention) | 75 | 25 |
| 2 (comparative) | 50 | 50 |
| 3 (comparative) | 25 | 75 |
| 4 (comparative) | 100 | 0 |
| 5 (comparative) | 0 | 100 |
| 6 (invention) | 80 | 20 |
| 7 (invention) | 85 | 15 |

As can be seen and appreciated in FIG. 1, the PVC composition comprising only the non-functionalized process aid (A), but no functionalized process aid (B) had good melt extensibility, but poor initial melt strength. The poor initial melt strength is associated with lower quality foams when the PVC is foamed. In contrast, the PVC composition comprising only the functionalized process aid (B), but no non-functionalized process aid (A) had good initial melt strength, but poor melt extensibility, since the extruded strand broke at about 25 mm/second pull-off speed. The PVC compositions utilizing the process aid blends of both A and B comprising half or more of their weight as the functionalized process aid (B) exhibited better melt strength than even the 100% functionalized process aid, but the melt elongation was still too low to produce acceptable foam. The PVC formulations utilizing process aid blends comprising by weight more than half non-functionalized process aid (A), with the balance of the process aid blend being the functionalized process aid (B) surprisingly had minimal deterioration in the initial melt strength, but dramatically improved elongation, compared to PVC compositions utilizing process aid blends comprising more than half of the functionalized process aids by weight. Thus, these results illustrate the surprising effect that not only the combination of the functionalized and non-functionalized process aids, but a specific range of the relative amounts of each of the functionalized and non-functionalized process aids are necessary to achieve a high-quality foamed PVC component.

Example 2: Foam Density and Cell Structure

PVC foam samples were made, using four different feed rates of a chemical blowing agent (CBA) and two different process aids. Foam PVC extrusion took place using a Cincinnati Milacron CM-55 conical, twin-screw extruder. Foam extrusion utilized a barrel and die-zone temperature profile set at: 285° F. (140° C.)/300° F. (150° C.)/320° F. (160° C.)/385° F. (200° C.)/360° F. (180° C.) (Barrel Zone 1/Zone 2/Zone 3/Zone 4/Die Zone, respectively). Oil was used to cool the screws and the sheet die. The screw oil running through the extruder screws were set to 265° F. (130° C.) while the oil in the sheet die lip was set to 355° F. (180° C.). The PVC sheet extrusion was done using a Cloeren 9 inch (22.9 cm) wide sheet die with a 0.250 inch (0.64 cm) die opening. The PVC melt exiting the die was fed through a three-roll stack where the PVC foam sheet was formed to an approximately 0.500 inch (1.27 cm) thickness.

Except for the addition of the process aids, the PVC compositions and processing conditions were identical. The PVC formulation was the same as that shown in Table 1, but with a total amount of process aid or process aid blends added at 5 phr instead of the 3 phr used in Example 1. The process aids were:

1) 70:30 weight ratio of non-functionalized process aid (A) to a functionalized process aid (B); and
2) 100% non-functionalized process aid (A).

The density of each sample was measured as follows: 1" L×1" W×½" thick samples were cut from the center of a 9" W×3' L×½" thick PVC foam board. Then the samples density values are obtained using a Alfa Mirage Electronic Densimeter MD-300S following ASTM D792 Standard Test Methods for Density and Specific Gravity (Relative Density) of Plastics by Displacement, Test Method A—For testing solid plastics in water (de-ionized). This process is repeated three times using three individual test specimens collected over a five (5) minute period to obtain an average density.

The results are shown in FIG. 2.

Table 3 shows the measured density for the PVC samples, as well as the percent reduction in density as a result of using the process aid blend compared to the non-functionalized process aid on its own. The percent reduction in density was calculated as:

$$\text{Percent density reduction} = 100 \times [(\rho_{nf} - \rho_b)/\rho_{nf}]$$

where: $\rho_{nf}$=density of foamed PVC made with non-functionalized process aid only
and $\rho_b$=density of foamed PVC made with blend of functionalized and non-functionalized process aids.

TABLE 3

Densities of Example 2 foamed PVC components

| CBA Feed Rate (kg/hr) | Density (g/cm$^3$) | | Density Reduction (%) |
| --- | --- | --- | --- |
| | 100% (A) (non-f PA) | 70% (A) (non-f PA) 30% (B) (f-PA) | 70/30 (A/B) vs. 100 A |
| 1.43 | 0.559 | 0.548 | 2.0 |
| 1.50 | | 0.522 | — |
| 1.56 | | 0.514 | — |
| 1.63 | 0.506 (voids) | 0.501 | 1.0 |

Optical microscopy analyzed the PVC foamed samples made using 5 phr of process aid. Optical microscopy analysis utilized a Nikon ME600 optical microscope and a Nikon D850 DSLR. Prior to imaging and analysis, PVC foam samples were polished and painted with ink to aid in cell size measurement. IGOR Pro® 7 from WaveMetrics was used to analyze cell uniformity through measurements of average cell (2-D particle) size to show differences in the resulting cell structure based on the process aid blends used in the PVC foam formulations. The software applies a Hough transform to the image or alternatively, the user can manually identify cells to begin analysis and look at average cell size. After identification of cells or voids in the PVC foam structure, the images are transformed from 8 bit grayscale into a binary format where foam cells, for example, are assigned a "1" and non-cell areas are assigned a "0". Using a reference, the pixels are then scaled to a micrometer measurement that is known, and cell size can thus be assigned. A scale bar provided by Nikon was used to calibrate samples shown in FIG. 3 and Table 4. Table 4 shows the differences between foamed PVC using only non-functionalized process aid (A) versus the process aid blend (70/30 A/B). Analysis of cell size and uniformity was taken from foam cellular structure at the center of the ½" extruded PVC foam boards. Additionally, images in FIG. 3 show PVC foam using only the non-functionalized process aid (A) and PVC foam using a process aid blend (A:B at 70:30 ratio). As can be seen in the figure, the PVC foam made with 100% of the non-functionalized process aid not only had a higher density, but a lower cell uniformity compared to the 70:30 weight ratio blend of non-functionalized to functionalized process aids. Referenced in Table 3 and FIG. 2, voids can begin to appear in a foamed PVC article when the melt strength of the PVC is no longer capable of capturing evolved gas from the CBA used in the formulation. FIG. 4 shows an image of a void in the cellular structure. In foam articles where voids are formed, density reduction may appear be higher because of large open cell structure, however, the cell uniformity is poor and undesirable.

TABLE 4

Cell Structure Analysis through Optical Microscopy

| Process Aid | CBA Feed Rate (kg/hr) | Avg. Cell Size (μm) |
| --- | --- | --- |
| A | 1.43 | 145 ± 89 |
| A | 1.63 | 135 ± 71 |
| 70/30 (A/B) | 1.43 | 133 ± 56 |
| 70/30 (A/B) | 1.63 | 113 ± 48 |

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A foamed polyvinyl chloride (PVC) component comprising:
   a) a PVC resin;
   b) a process aid blend; and
   c) a blowing agent;
   wherein the process aid blend comprises from about 1% by weight to about 20% by weight of a functionalized process aid and from about 99% by weight to about 80% by weight, of a non-functionalized process aid, based on 100% by weight of the process aid blend,
   wherein the functionalized process aid comprises at least one base polymer which is functionalized with from 0.1 wt. % to 35 wt. % of a reactive epoxy, hydroxyl, β-keto ester, β-keto amide, or carboxylic acid functional group or mixture thereof based on a total weight of the functionalized process aid;
   wherein the process aid blend is present in an amount from 0.1 to 15 parts per hundred (phr) by weight of the PVC resin; and
   wherein the foamed PVC component comprising the process aid blend has a lower density than a reference foamed PVC component comprising a 100% non-functionalized process aid, and wherein the foamed PVC component comprising the process aid blend and the reference foamed PVC component comprising the 100% non-functionalized process aid are made using the same process conditions and additives.

2. The foamed PVC component according to claim 1, wherein the foamed PVC component comprising the process aid blend has a density that is at least 2 percent less than the density of the reference foamed PVC component.

3. The foamed PVC component according to claim 1, wherein the base polymer of the functionalized process aid is derived from one or more monomers comprising (meth)acrylic-containing monomers.

4. The foamed PVC component according to claim 1, wherein the base polymer of the functionalized process aid is derived from i) one or more monomers comprising (meth)acrylic-containing monomer and ii) at least one monomer selected from the group consisting of vinyl-containing monomers, styrene and styrene derivatives, olefins, dienes, and mixtures thereof.

5. The foamed PVC component according to claim 1, wherein the reactive epoxy, hydroxyl, ß-keto ester, ß-keto-amide, or carboxylic acid functional group is derived from hydroxyl-substituted alkyl esters of (meth) acrylic acid; vinyl esters of linear or branched carboxylic acids; unsaturated $C_3$-$C_6$ monocarboxylic acids and unsaturated $C_4$-$C_6$ dicarboxylic acids; β-keto esters of (meth)acrylic acids; β-keto amides of (meth)acrylic acids; epoxy group-containing monomers; or mixtures thereof.

6. The foamed PVC component according to claim 1, wherein the non-functionalized process aid comprises an acrylic polymer or an acrylic copolymer.

7. The foamed PVC component according to claim 1, wherein the functionalized process aid has a weight average molecular weight of at least 50,000 g/mol.

8. The foamed PVC component according to claim 1, wherein the non-functionalized process aid comprises a polymer.

9. The foamed PVC component according to claim 8, wherein the non-functionalized process aid comprises chlorinated polyethylene (PE-C).

10. The foamed PVC component according to claim 1, wherein the foamed PVC component is a building material or flooring.

11. A method of making a foamed polyvinyl chloride (PVC) component, wherein the method comprises:
combining:
a) a polyvinyl chloride (PVC) resin,
b) a process aid blend, wherein the process aid blend comprises from about 1% by weight to about 20% by weight of a functionalized process aid and from about 99% by weight to about 80% by weight of a non-functionalized process aid based on 100% by weight of the process aid blend; and
c) a blowing agent;
to form a foamable PVC composition; and
processing the foamable PVC composition to form the foamed PVC component;
wherein the functionalized process aid comprises at least one base polymer which is functionalized with from 0.1 wt. % to 35 wt. % of a reactive epoxy, hydroxyl, β-keto ester, β-keto amide, or carboxylic acid functional group, or mixture thereof based on a total weight of the functionalized process aid; and
wherein the foamed PVC component comprising the process aid blend has a lower density than a reference foamed PVC component comprising a 100% non-functionalized process aid, and wherein the foamed PVC component comprising the process aid blend and the reference foamed PVC component comprising the 100% non-functionalized process aid are made using the same process conditions and additives; and
wherein the process aid blend is present in an amount from 0.1 to 15 parts per hundred (phr) by weight of the PVC resin.

12. The method of making a foamed PVC component according to claim 11, wherein the foamed PVC component comprising the process aid blend has a density that is at least 2 percent less than the density of the reference foamed PVC component.

13. The method of making a foamed PVC component according to claim 11, wherein the base polymer of the functionalized process aid is derived from one or more monomers comprising (meth)acrylic-containing monomers.

14. The method of making a foamed PVC component according to claim 11, wherein the base polymer of the functionalized process aid is derived from i) one or more monomers comprising (meth)acrylic-containing monomer and ii) at least one monomer selected from the group consisting of vinyl-containing monomers, styrene and styrene derivatives, olefins, dienes, and mixtures thereof.

15. The method of making a foamed PVC component according to claim 11, wherein the reactive epoxy, hydroxyl, β-keto ester, β-ketoamide, or carboxylic acid functional group is derived from hydroxyl-substituted alkyl esters of (meth) acrylic acid; vinyl esters of linear or branched carboxylic acids; unsaturated $C_3$-$C_6$ monocarboxylic acids and unsaturated $C_4$-$C_6$ dicarboxylic acids; β-keto esters of (meth)acrylic acids; β-keto amides of (meth)acrylic acids; epoxy group-containing monomers; or mixtures thereof.

16. The method of making a foamed PVC component according to claim 15, wherein the base polymer is functionalized with a reactive epoxy functional group derived from glycidyl methacrylate, or glycidyl acrylate, or mixtures thereof.

17. The method of making a foamed PVC component according to claim 11, wherein the non-functionalized process aid comprises an acrylic polymer or an acrylic copolymer.

18. The method of making a foamed PVC component according to claim 11, wherein the functionalized process aid has a weight average molecular weight of at least 50,000 g/mol.

19. The method of making a foamed PVC component according to claim 11, wherein the non-functionalized process aid comprises a polymer.

20. The method of making a foamed PVC component according to claim 19, wherein the non-functionalized process aid comprises chlorinated polyethylene (PE-C).

21. The method of making a foamed PVC component according to claim 11, wherein the foamed PVC component is a building or flooring material.

* * * * *